(12) United States Patent
Chen et al.

(10) Patent No.: US 10,931,147 B2
(45) Date of Patent: Feb. 23, 2021

(54) HYBRID POWER CONVERTER

(71) Applicant: x2 Power Technologies Limited, Grand Cayman (KY)

(72) Inventors: Junxiao Chen, Shanghai (CN); Jinbiao Huang, Nashua, NH (US); Zeng Li, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 157 days.

(21) Appl. No.: 16/133,101

(22) Filed: Sep. 17, 2018

(65) Prior Publication Data

US 2019/0305598 A1    Oct. 3, 2019

Related U.S. Application Data

(60) Provisional application No. 62/649,756, filed on Mar. 29, 2018.

(51) Int. Cl.
*H02J 50/12* (2016.01)
*H02M 3/337* (2006.01)
*H04B 5/00* (2006.01)

(52) U.S. Cl.
CPC ........... *H02J 50/12* (2016.02); *H02M 3/3376* (2013.01); *H04B 5/0037* (2013.01); *H04B 5/0093* (2013.01)

(58) Field of Classification Search
CPC .... H02J 50/12; H02M 3/3376; H04B 5/0037; H04B 5/0093
USPC ......................................................... 307/104
See application file for complete search history.

(56) References Cited

U.S. PATENT DOCUMENTS

| | | | |
|---|---|---|---|
| 2016/0190921 A1* | 6/2016 | Kumar | H02M 3/07 323/271 |
| 2016/0214488 A1* | 7/2016 | Okamoto | H02J 7/0029 |
| 2017/0008385 A1* | 1/2017 | Fujimoto | B60K 7/0007 |
| 2017/0279354 A1* | 9/2017 | Lueders | H02M 3/158 |
| 2018/0309372 A1* | 10/2018 | Leong | H02M 3/33576 |
| 2019/0356149 A1* | 11/2019 | Li | H02M 7/219 |

FOREIGN PATENT DOCUMENTS

| | | |
|---|---|---|
| CN | 1933272 A | 3/2007 |
| CN | 105594097 A | 5/2016 |
| CN | 105915030 A | 8/2016 |

* cited by examiner

*Primary Examiner* — Michael R. Fin
(74) *Attorney, Agent, or Firm* — Slater Matsil, LLP

(57) ABSTRACT

A converter comprises a first switch, a capacitor and a second switch connected in series between an input voltage source and an output filter, a third switch connected between a common node of the first switch and the capacitor, and a common node of the second switch and the output filter and a fourth switch connected between a common node of the capacitor and the second switch, and ground.

18 Claims, 18 Drawing Sheets

HYBRID POWER CONVERTER

CROSS REFERENCE TO RELATED APPLICATIONS

This application claims priority to U.S. Provisional Application Ser. No. 62/649,756, entitled, "Hybrid Power Converter" and filed on Mar. 29, 2018, which application is hereby incorporated herein by reference.

TECHNICAL FIELD

The present invention relates to a hybrid power converter, and, in particular embodiments, to a hybrid power converter in a receiver of a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

As the power of the wireless power transfer system goes higher, there may be a need for achieving a high-efficiency wireless power transfer between the transmitter and the receiver. More particularly, achieving a high efficiency wireless power transfer under various input and output conditions (e.g., different load currents and/or different rated input voltages of the receiver) has become a significant issue, which presents challenges to the system design of the wireless power transfer system.

It would be desirable to have a high performance power receiver exhibiting good behaviors such as high efficiency under a variety of input and output conditions.

SUMMARY

These and other problems are generally solved or circumvented, and technical advantages are generally achieved, by preferred embodiments of the present disclosure which provide a hybrid power converter in a receiver of a wireless power transfer system.

In accordance with an embodiment, an apparatus comprises a first switch, a capacitor and a second switch connected in series between an input voltage source and an output filter, a third switch connected between a common node of the first switch and the capacitor, and a common node of the second switch and the output filter and a fourth switch connected between a common node of the capacitor and the second switch, and ground.

In accordance with another embodiment, a method comprises detecting a load current, an input voltage and an output voltage of a power system comprising a hybrid converter, configuring the hybrid converter to operate in three different operating modes in response to different operating conditions and configuring the hybrid converter to leave a first operating mode and enter into a second operating mode in response to an operating condition change.

In accordance with yet another embodiment, a system comprises a receiver coil configured to be magnetically coupled to a transmitter coil, a rectifier connected to the receiver coil and a hybrid converter connected between the rectifier and a load, wherein the hybrid converter is configured to operate in three different operating modes in response to different load currents and output voltages of the system.

An advantage of an embodiment of the present disclosure is a hybrid power converter in a receiver of a wireless power transfer system operates in the hybrid mode and charge pump mode to achieve high efficiency. Furthermore, a combination of the hybrid mode, the charge pump mode and the buck mode helps to provide flexibility in different operation conditions.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a hybrid power converter operating in different operating modes for increasing efficiency and performance of wireless power transfer systems. The disclosure may also be applied, however, to a variety of power systems. Hereinafter, various embodiments will be explained in detail with reference to the accompanying drawings.

Figure 1:
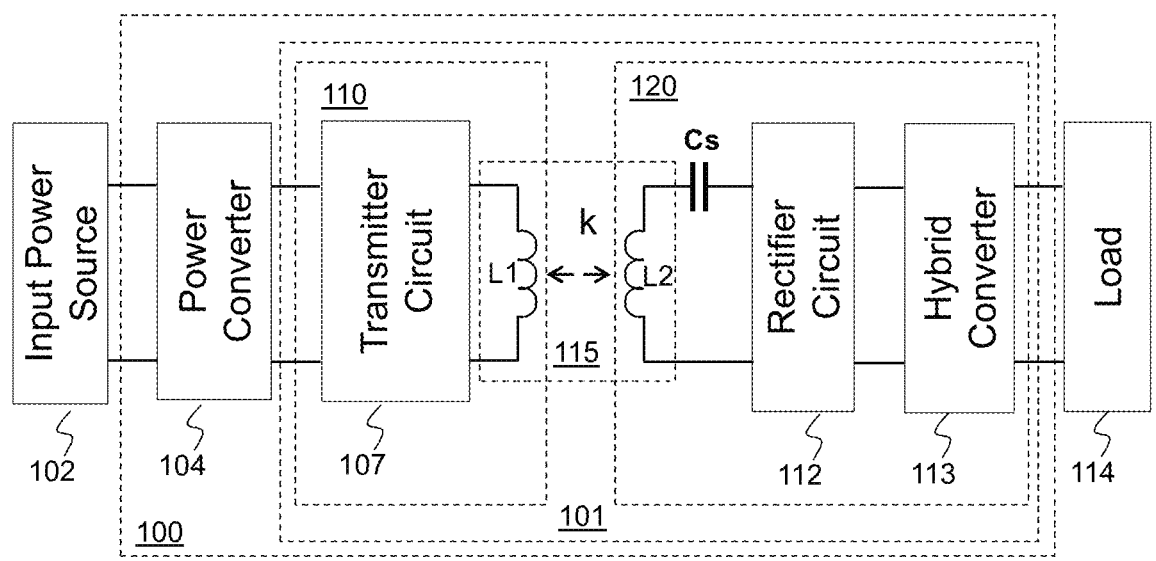
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a hybrid converter 113 connected in cascade. As shown in FIG. 1, the resonant capacitor Cs is connected in series with the receiver coil L2 and further connected to the inputs of the rectifier 112. The outputs of the rectifier 112 are connected to the inputs of the hybrid converter 113. The outputs of the hybrid converter 113 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is place near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1.

The rectifier 112 converts an alternating polarity waveform received from the output of the receiver coil L2 to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The hybrid converter 113 is coupled between the rectifier 112 and the load 114. The hybrid converter 113 is a non-isolated power converter. By controlling the on/off of the switches of the hybrid converter 113, the hybrid converter 113 can be configured as a buck converter, a charge pump converter or a hybrid converter.

Depending design needs and different applications, the hybrid converter 113 may operate in different operating modes. More particularly, the hybrid converter 113 may operate in a buck mode when the load current is less than a predetermined current threshold and/or the input voltage is less than a predetermined voltage threshold. In the buck mode, the hybrid converter 113 is configured as a buck converter. The hybrid converter 113 may operate in a charge pump mode or a hybrid mode when the input voltage is greater than the predetermined voltage threshold and/or the load current is greater than the predetermined current threshold. More particularly, in some embodiments, the hybrid converter 113 may operate in a charge pump mode or a hybrid mode when a ratio of the output voltage of the hybrid converter to the input voltage of the hybrid converter is less than 0.5. In the charge pump mode, the hybrid converter 113 is configured as a charge pump converter. In the hybrid mode, the hybrid converter 113 is configured as a hybrid converter.

The schematic diagram of the hybrid converter 113 will be described below with respect to FIG. 2. The detailed configuration (e.g., different operating modes and their corresponding converter configurations) of the hybrid converter 113 will be described below with respect to FIGS. 3-12.

In some embodiments, the input voltage of the hybrid converter 113 is in a range from about 18 V to about 22 V. The output voltage of the hybrid converter 113 is about 9 V. One advantageous feature of having the hybrid converter 113 is that a higher output voltage (e.g., 22 V) can be achieved at the output of the rectifier 112. Such a higher output voltage helps to lower down the current flowing through the receiver coil L2, thereby improving the efficiency of the power receiver 120.

Figure 2:
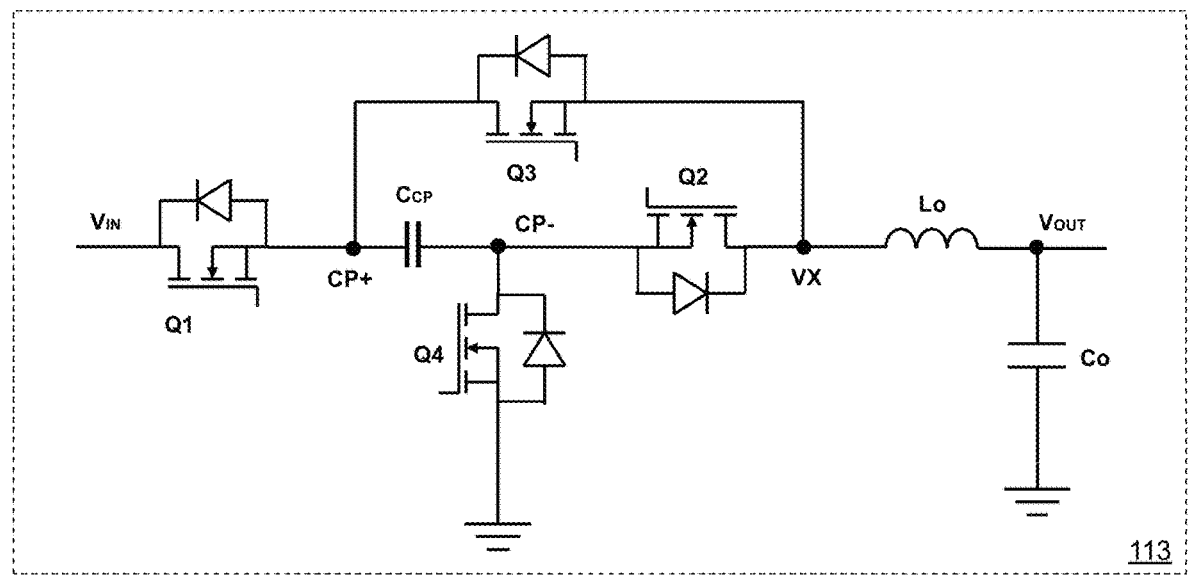
FIG. 2 illustrates a schematic diagram of the hybrid converter in accordance with various embodiments of the present disclosure.

FIG. 2 illustrates a schematic diagram of the hybrid converter in accordance with various embodiments of the present disclosure. The hybrid converter 113 comprises a first switch Q1, a capacitor $C_{CP}$, a second switch Q2, a third switch Q3, a fourth switch Q4, an output inductor Lo and an output capacitor Co. As shown in FIG. 2, the output inductor Lo and the output capacitor Co form an output filter. The first switch Q1, the capacitor $C_{CP}$ and the second switch Q2 are connected in series between an input voltage source VIN and the output filter. A common node of the first switch Q1 and the capacitor $C_{CP}$ is denoted as CP+ as shown in FIG. 2. Likewise, a common node of the second switch Q2 and the capacitor $C_{CP}$ is denoted as CP−. A common node of the second switch Q2 and the output filter is denoted as VX. As shown in FIG. 2, the third switch Q3 is connected between CP+ and VX. The fourth switch Q4 is connected between CP− and ground.

In some embodiments, the capacitor $C_{CP}$ functions as a charge pump capacitor. Throughout the description, the capacitor $C_{CP}$ is alternatively referred to as the charge pump capacitor $C_{CP}$.

In accordance with an embodiment, the switches (e.g., switches Q1-Q4) may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted while FIG. 2 shows the switches Q1-Q4 are implemented as single n-type transistors, a person skilled in the art would recognize there may be many variations, modifications and alternatives. For example, depending on different applications and design needs, the switches Q1-Q4 may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

The hybrid converter 113 includes three different operating modes, namely a hybrid mode, a charge pump mode and a buck mode. In some embodiments, when the output power of the wireless power system supports the 5 W baseband power profile (BPP) and 5-15 W extended power profile (EPP), the hybrid converter 113 operates in the buck mode. When the output power of the wireless power system supports the 5-15 W BPP and 15-20 W EPP, the hybrid converter 113 operates in either the hybrid mode or the charge pump mode. Furthermore, the hybrid converter 113 may operate in a mode combining the hybrid mode and the charge pump mode. In other words, the hybrid converter 113 may have a mode transition between the hybrid mode and the charge pump mode.

It should be noted that the power range used in the previous example are selected purely for demonstration purposes and are not intended to limit the various embodiments of the present disclosure to any particular power range.

In the hybrid mode, the hybrid converter 113 operates in four different phases. In each phase, the current flowing through the output inductor Lo may ramp up or down depending on different combinations of the input voltage $V_{IN}$, the voltage across the charge pump capacitor $C_{CP}$ and the output voltage $V_{OUT}$. In the hybrid mode, the voltage of the hybrid converter 113 can be regulated to a predetermined voltage. Since the hybrid converter 113 under the hybrid mode has tight voltage regulation, any loads (e.g., battery chargers) can be connected to the output of the hybrid converter 113. The detailed operating principles of the hybrid mode will be described below with respect to FIGS. 3-6.

In the charge pump mode, the hybrid converter 113 operates in two different phases. In the charge pump mode, the voltage of the hybrid converter 113 is not regulated. Since the hybrid converter 113 under the charge pump mode may vary in a wide range, only some loads (e.g., battery chargers having good transient performance) can be connected to the output of the hybrid converter 113. The detailed operating principles of the charge pump mode will be described below with respect to FIGS. 7-8.

In the buck mode, the hybrid converter 113 operates in two different phases. The second switch Q2 and the third switch Q3 are always-on. As a result, the charge pump capacitor $C_{CP}$ is shorted and not part of the operation of the buck mode. In each phase, the current flowing through the output inductor Lo may ramp up or down depending on different combinations of the input voltage $V_{IN}$ and the output voltage $V_{OUT}$. The detailed operating principles of the buck mode will be described below with respect to FIGS. 9-10. Furthermore, in order to have a smooth transition between the buck mode and the charge pump mode, the hybrid converter 113 may operate in an auto mode. In the auto mode, the charge pump capacitor is floating when the buck mode is applicable to the hybrid converter 113. The detailed operating principles of the buck mode and the auto mode will be described below with respect to FIGS. 11-12.

In order to improve the performance of the wireless power transfer system 100 shown in FIG. 1, the hybrid converter 113 may be configured to operate in the hybrid mode. The hybrid mode includes four different phases. FIGS. 3-6 illustrate the operating principles of the four phases of the hybrid mode in accordance with various embodiments of the present disclosure.

Figure 3:
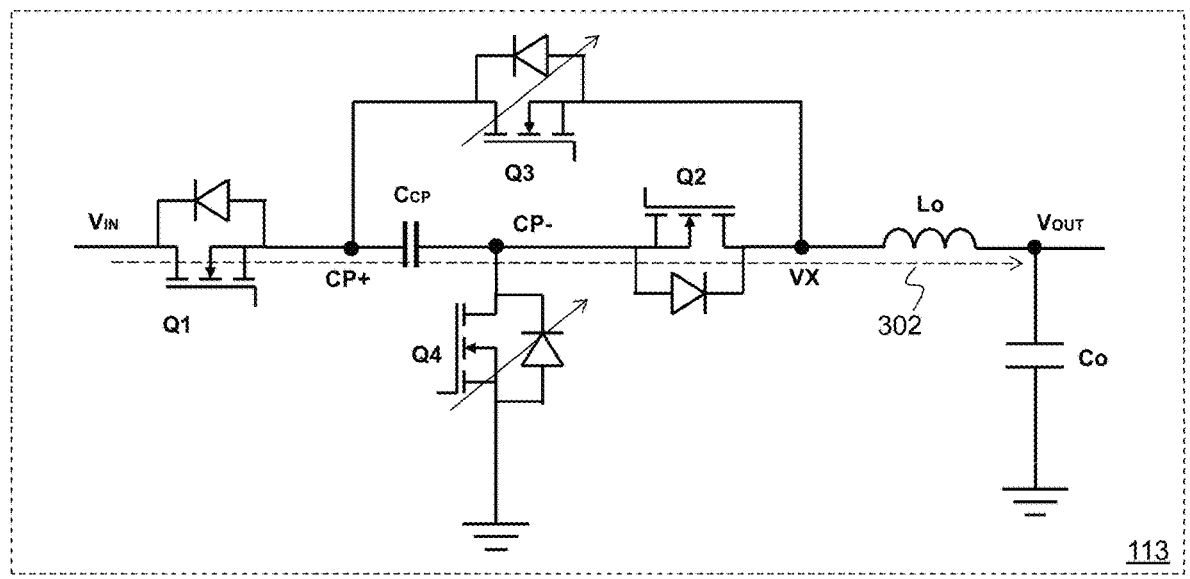
FIG. 3 illustrates the operating principle of the first phase of the hybrid mode in accordance with various embodiments of the present disclosure.

FIG. 3 illustrates the operating principle of the first phase of the hybrid mode in accordance with various embodiments of the present disclosure. During the first phase of the hybrid mode, switch Q3 is turned off as indicated by the arrow placed on top of the symbol of switch Q3. Likewise, switch Q4 is turned off as indicated by the arrow placed on top of the symbol of switch Q4. Since switches Q1 and Q2 are turned on as shown in FIG. 3, a conductive path is established as indicated by the dashed line 302. The conductive path is formed by switch Q1, the charge pump capacitor $C_{CP}$, switch Q2 and output inductor Lo. The current flows from the input power source $V_{IN}$ to the output voltage $V_{OUT}$ through the conductive path shown in FIG. 3.

During the first phase of the hybrid mode, the charge pump capacitor $C_{CP}$ is charged and energy is stored in the charge pump capacitor $C_{CP}$ accordingly. The current flowing through the inductor Lo may ramp up or down depending on the voltage applied across the inductor Lo. In some embodiments, when the input voltage VIN is greater than the sum of the voltage across the charge pump capacitor $C_{CP}$ and the output voltage $V_{OUT}$, the current flowing through the inductor Lo ramps up and the energy stored in the inductor Lo increases accordingly. The current slope S of the inductor Lo satisfies the following equation:

$$S = \frac{V_{IN} - V_{CS} - V_{OUT}}{L_O} \quad (1)$$

where $V_{CS}$ is the voltage across the charge pump capacitor $C_{CP}$.

Figure 4:
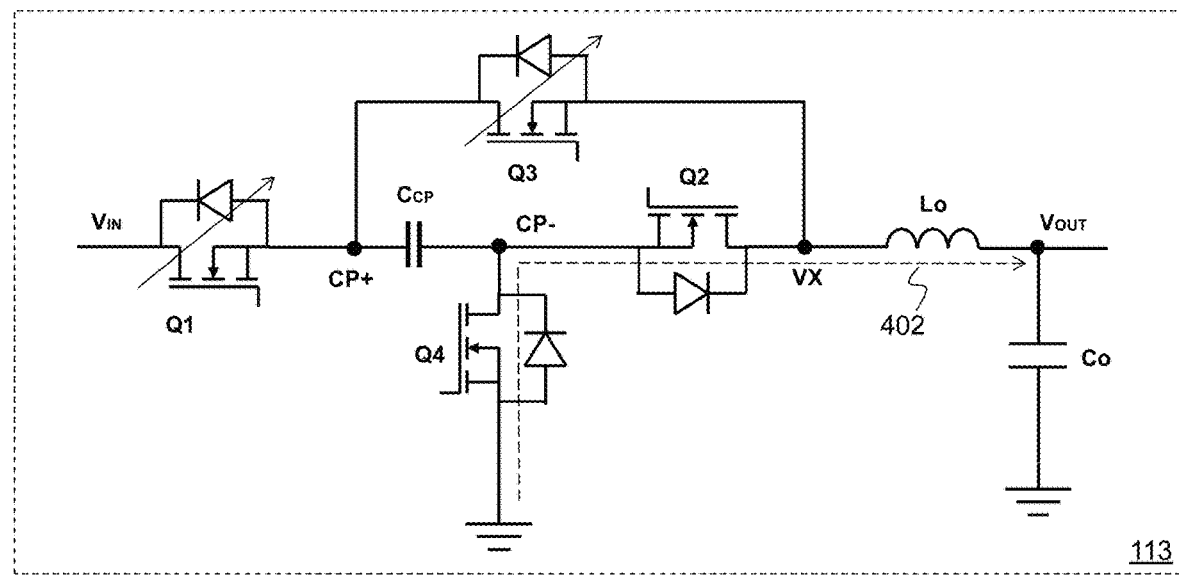
FIG. 4 illustrates the operating principle of the second phase of the hybrid mode in accordance with various embodiments of the present disclosure.

FIG. 4 illustrates the operating principle of the second phase of the hybrid mode in accordance with various embodiments of the present disclosure. During the second phase of the hybrid mode, switches Q1 and Q3 are turned off as indicated by the arrows placed on their symbols. Since switches Q2 and Q4 are turned on, a conductive path is established as indicated by the dashed line 402 shown in FIG. 4. The conductive path is formed by switch Q4, switch Q2 and output inductor Lo. In some embodiments, switch Q4 provides a freewheeling path for the current flowing through the output inductor Lo.

During the second phase of the hybrid mode, the charge pump capacitor $C_{CP}$ is isolated by the turned-off switches Q1 and Q3. The current flowing through the inductor Lo ramps down and the energy stored in the inductor Lo decreases accordingly. The current slope S of the inductor Lo satisfies the following equation:

$$S = \frac{-V_{OUT}}{L_O} \quad (2)$$

Figure 5:
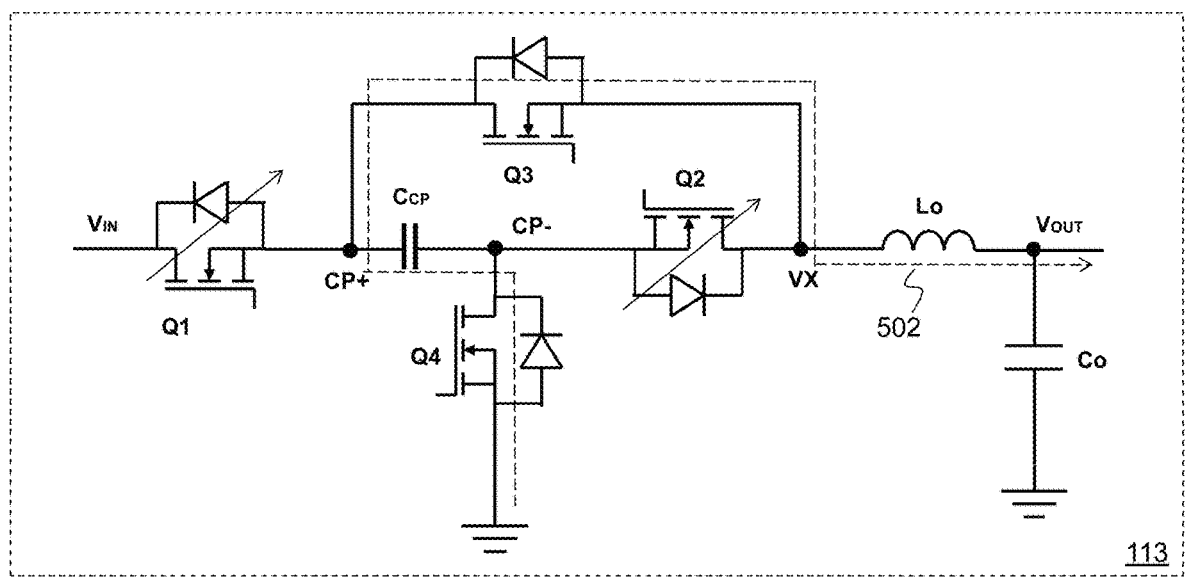
FIG. 5 illustrates the operating principle of the third phase of the hybrid mode in accordance with various embodiments of the present disclosure.

FIG. 5 illustrates the operating principle of the third phase of the hybrid mode in accordance with various embodiments of the present disclosure. During the third phase of the hybrid mode, switches Q1 and Q2 are turned off as indicated by the arrows placed on their symbols. Since switches Q3 and Q4 are turned on, a conductive path is established as indicated by the dashed line 502 shown in FIG. 5. The conductive path is formed by switch Q4, the charge pump capacitor $C_{CP}$, switch Q3 and output inductor Lo.

During the third phase of the hybrid mode, the current discharges the charge pump capacitor $C_{CP}$ and the energy stored in the charge pump capacitor $C_{CP}$ decreases accordingly. In some embodiments, the current flowing through the inductor Lo may ramp up and the energy stored in the inductor Lo increases accordingly. In the third phase of the hybrid mode, the current slope S of the inductor Lo satisfies the following equation:

$$S = \frac{V_{CS} - V_{OUT}}{L_O} \quad (3)$$

Figure 6:
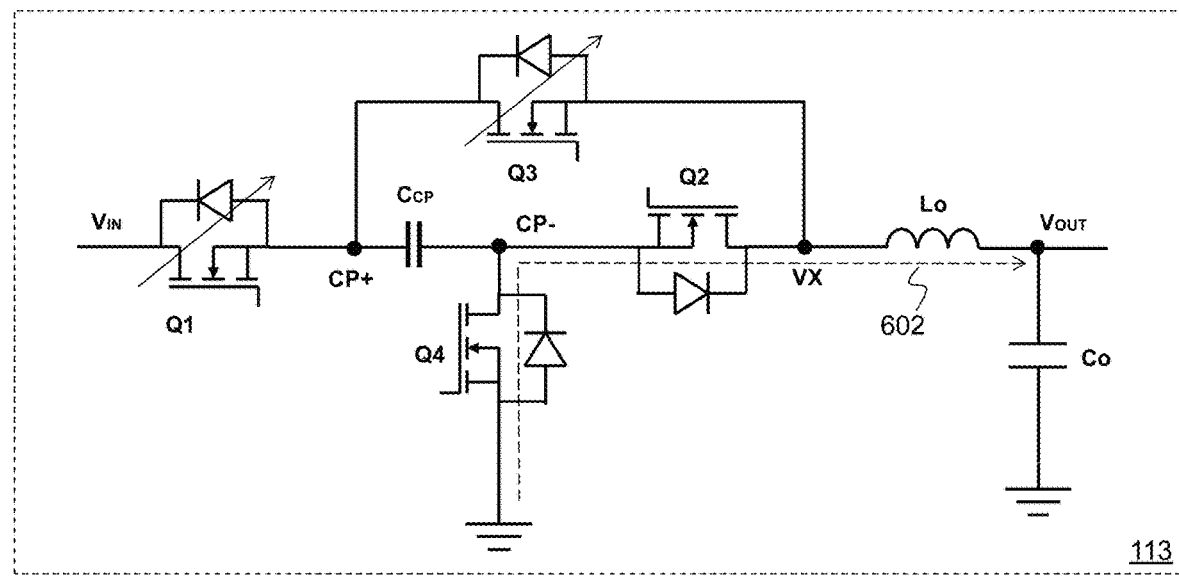
FIG. 6 illustrates the operating principle of the fourth phase of the hybrid mode in accordance with various embodiments of the present disclosure.

FIG. 6 illustrates the operating principle of the fourth phase of the hybrid mode in accordance with various embodiments of the present disclosure. During the fourth phase of the hybrid mode, switches Q1 and Q3 are turned off as indicated by the arrows placed on their symbols. Since switches Q2 and Q4 are turned on, a conductive path is established as indicated by the dashed line 602 shown in FIG. 6. The conductive path is formed by switch Q4, switch Q2 and output inductor Lo. In some embodiments, switch Q4 provides a freewheeling path for the current flowing through the output inductor Lo.

During the fourth phase of the hybrid mode, the charge pump capacitor $C_{CP}$ is isolated by the turned-off switches Q1 and Q3. The current flowing through the inductor Lo ramps down and the energy stored in the inductor Lo decreases accordingly. In the fourth phase of the hybrid mode, the current slope S of the inductor Lo satisfies the following equation:

$$S = \frac{-V_{OUT}}{L_O} \quad (4)$$

It should be noted during the hybrid mode, the hybrid converter 113 may operate in the four phases described above with respect to FIGS. 3-6. More particularly, the hybrid converter 113 may operate in the four phases in a sequential order as indicated by the phase number. In addition, the operating time of each phase may be determined by a controller (not shown). The controller detects various operating parameters (e.g., input voltage, output voltage, load current, any combinations thereof and the like). Based upon the detected operating parameters, the controller sets up the operating time of each phase.

Figure 7:
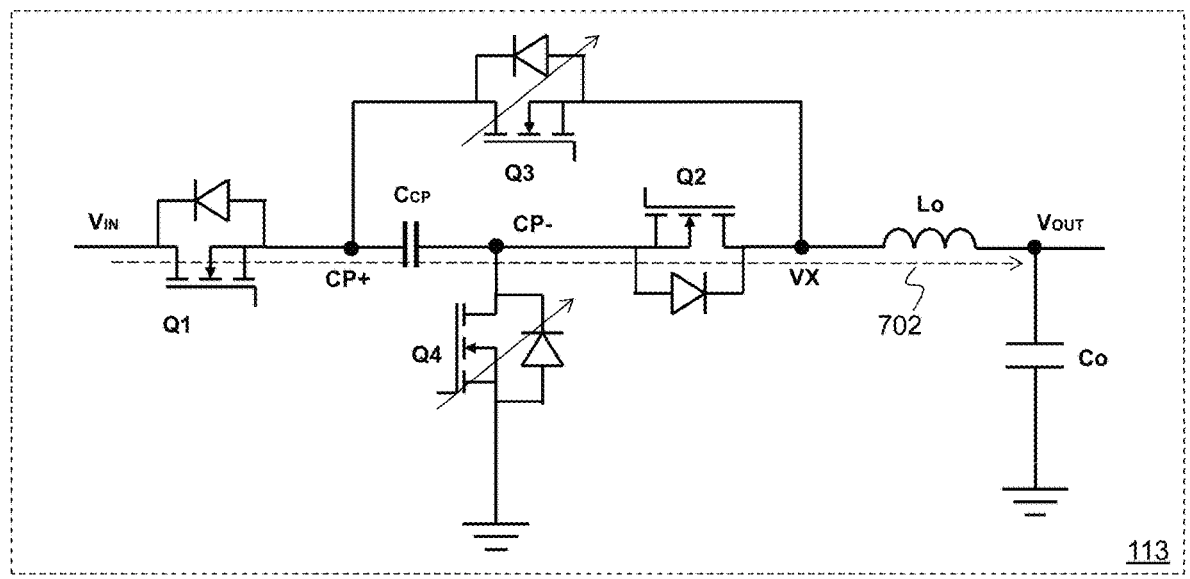
FIG. 7 illustrates the operating principle of the first phase of the charge pump mode in accordance with various embodiments of the present disclosure.

FIG. 7 illustrates the operating principle of the first phase of the charge pump mode in accordance with various embodiments of the present disclosure. During the first phase of the charge pump mode, switch Q3 is turned off as indicated by the arrow placed on top of the symbol of switch Q3. Likewise, switch Q4 is turned off as indicated by the arrow placed on top of the symbol of switch Q4. Since switches Q1 and Q2 are turned on, a conductive path is established as indicated by the dashed line 702 shown in FIG. 7. The conductive path is formed by switch Q1, the charge pump capacitor $C_{CP}$, switch Q2 and output inductor Lo. The current flows from the input power source $V_{IN}$ to the output voltage $V_{OUT}$ through the conductive path shown in FIG. 7. During the first phase of the charge pump mode, the charge pump capacitor $C_{CP}$ is charged and energy is stored in the charge pump capacitor $C_{CP}$ accordingly.

Figure 8:
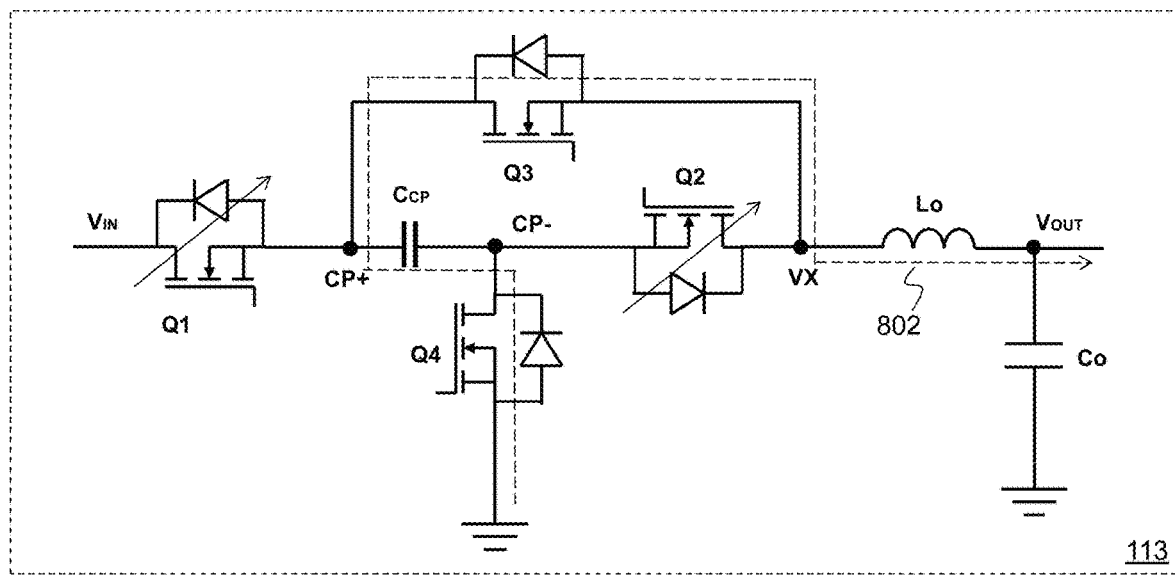
FIG. 8 illustrates the operating principle of the second phase of the charge pump mode in accordance with various embodiments of the present disclosure.

FIG. 8 illustrates the operating principle of the second phase of the charge pump mode in accordance with various embodiments of the present disclosure. During the second phase of the charge pump mode, switches Q1 and Q2 are turned off as indicated by the arrows placed on their symbols. Since switches Q3 and Q4 are turned on, a conductive path is established as indicated by the dashed line 802 shown in FIG. 8. The conductive path is formed by switch Q4, the charge pump capacitor $C_{CP}$, switch Q3 and output inductor Lo. During the second phase of the charge pump mode, the current discharges the charge pump capacitor $C_{CP}$ and the energy stored in the charge pump capacitor $C_{CP}$ decreases accordingly.

It should be noted during the charge pump mode, the output inductor Lo is an optional element. Depending different applications and design needs, the output inductor Lo may be removed for further reducing the cost of the hybrid converter 113.

Figure 9:
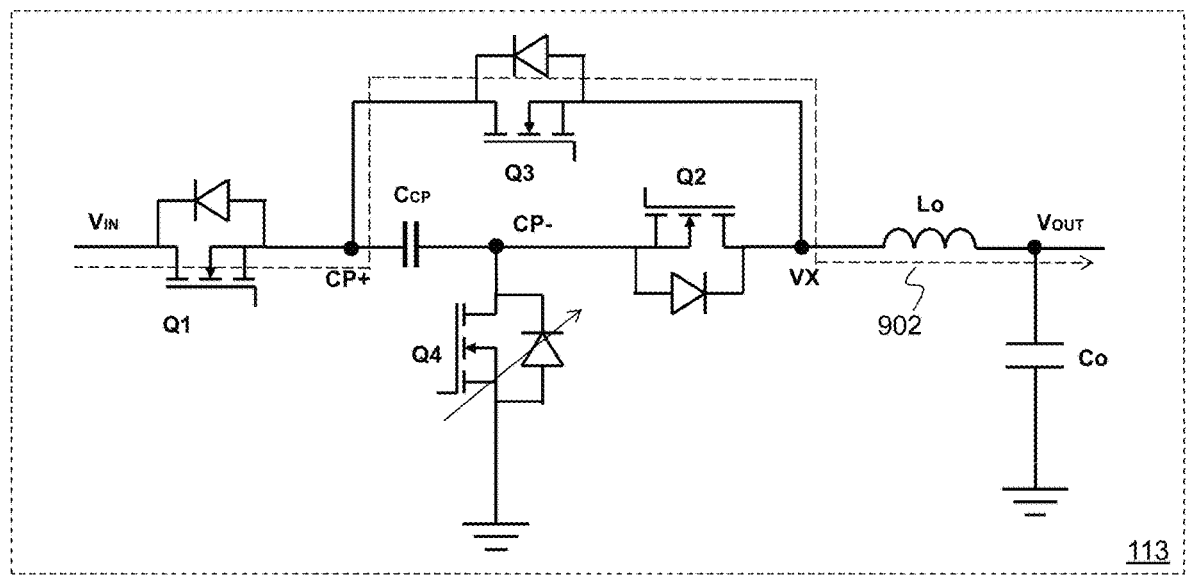
FIG. 9 illustrates the operating principle of the first phase of the buck mode in accordance with various embodiments of the present disclosure.

FIG. 9 illustrates the operating principle of the first phase of the buck mode in accordance with various embodiments of the present disclosure. During the buck mode, switches Q2 and Q3 are always on. In the first phase of the buck mode, switch Q4 is turned off as indicated by the arrow placed on top of the symbol of switch Q4. Since switches Q1, Q2 and Q3 are turned on, the charge pump capacitor $C_{CP}$ is shored by the turned-on switches Q2 and Q3, and a conductive path is established as indicated by the dashed line 902 shown in FIG. 9. The conductive path is formed by switch Q1, switch Q3 and output inductor Lo. The current flows from the input power source $V_{IN}$ to the output voltage $V_{OUT}$ through the conductive path shown in FIG. 9.

During the first phase of the buck mode, the current flowing through the inductor Lo ramps up and the energy stored in the inductor L increases accordingly. The current slope S of the inductor Lo satisfies the following equation:

$$S = \frac{V_{IN} - V_{OUT}}{L_O} \quad (5)$$

Figure 10:
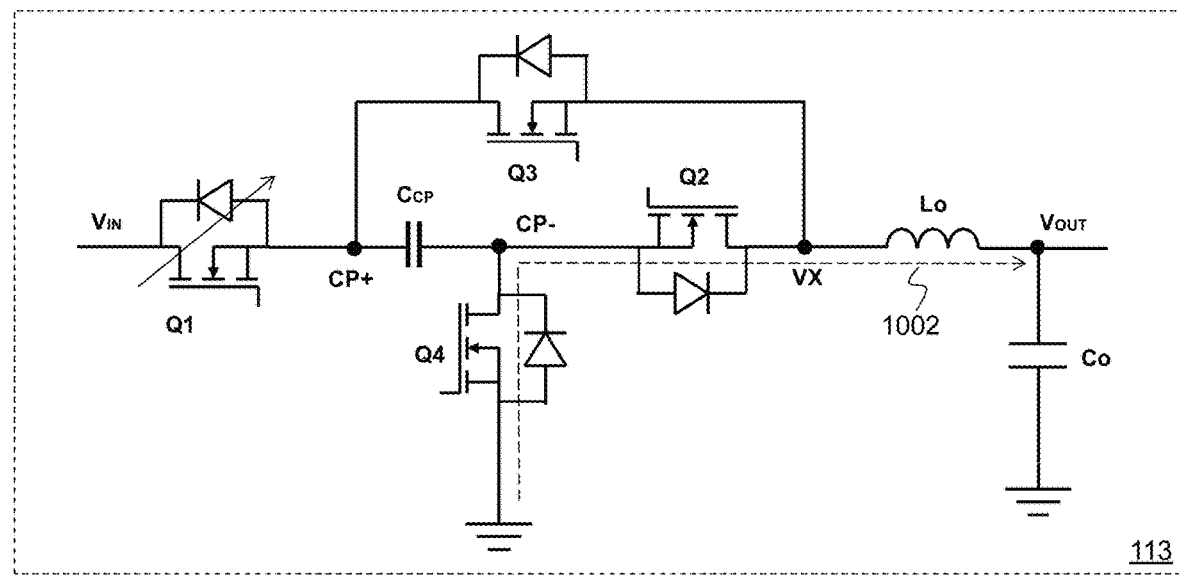
FIG. 10 illustrates the operating principle of the second phase of the buck mode in accordance with various embodiments of the present disclosure.

FIG. 10 illustrates the operating principle of the second phase of the buck mode in accordance with various embodiments of the present disclosure. During the second phase of the charge pump mode, switch Q1 is turned off as indicated by the arrow placed on its symbol. A conductive path is established as indicated by the dashed line 1002 shown in FIG. 10. The conductive path is formed by switch Q4, switch Q2 and output inductor Lo.

During the second phase of the buck mode, the current flowing through the inductor Lo ramps down and the energy stored in the inductor Lo decreases accordingly. The current slope S of the inductor Lo satisfies the following equation:

$$S = \frac{-V_{OUT}}{L_O} \quad (6)$$

Figure 11:
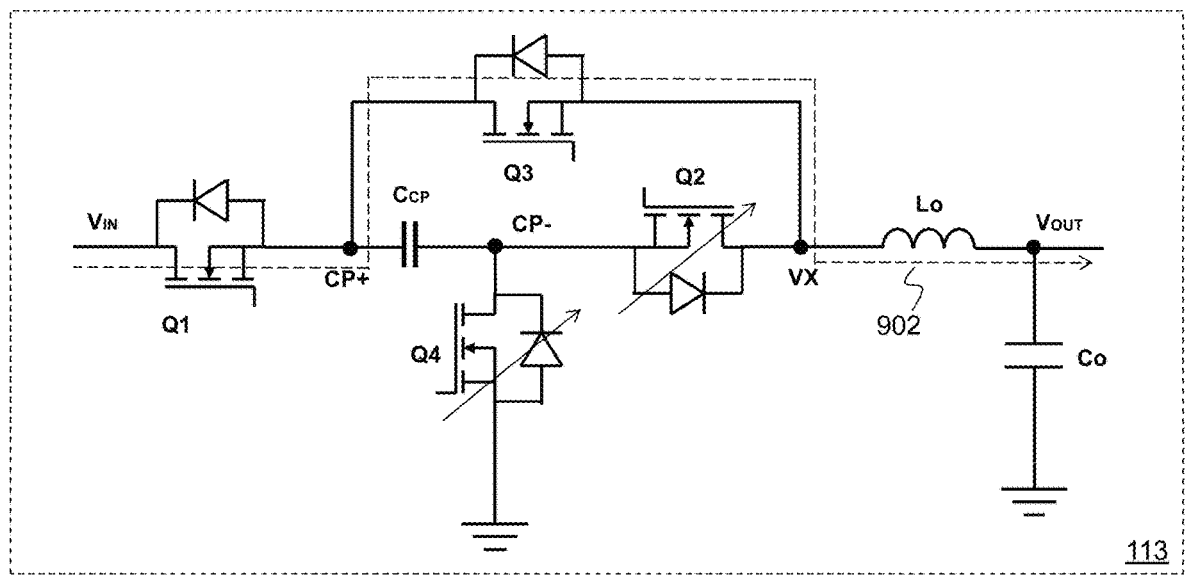
FIG. 11 illustrates the operating principle of the first phase of the hybrid converter operating in both the buck mode and the auto mode in accordance with various embodiments of the present disclosure.

FIG. 11 illustrates the operating principle of the first phase of the hybrid converter operating in both the buck mode and the auto mode in accordance with various embodiments of the present disclosure. The buck mode operating principle of the hybrid converter 113 is similar to that shown in FIG. 9 except that switch Q2 is turned off during the first phase. It should be noted that during the first phase shown in FIG. 11, the charge pump capacitor $C_{CP}$ is floating. In addition, the charge pump capacitor $C_{CP}$ has been pre-charged to a voltage level approximately equal to twice the output voltage of the hybrid converter 113. Such a pre-charged voltage helps to achieve a smooth transition between the buck mode and the charge pump mode. In particular, the hybrid converter 113 can leave the buck mode and smoothly enter into the charge pump mode if necessary.

Figure 12:
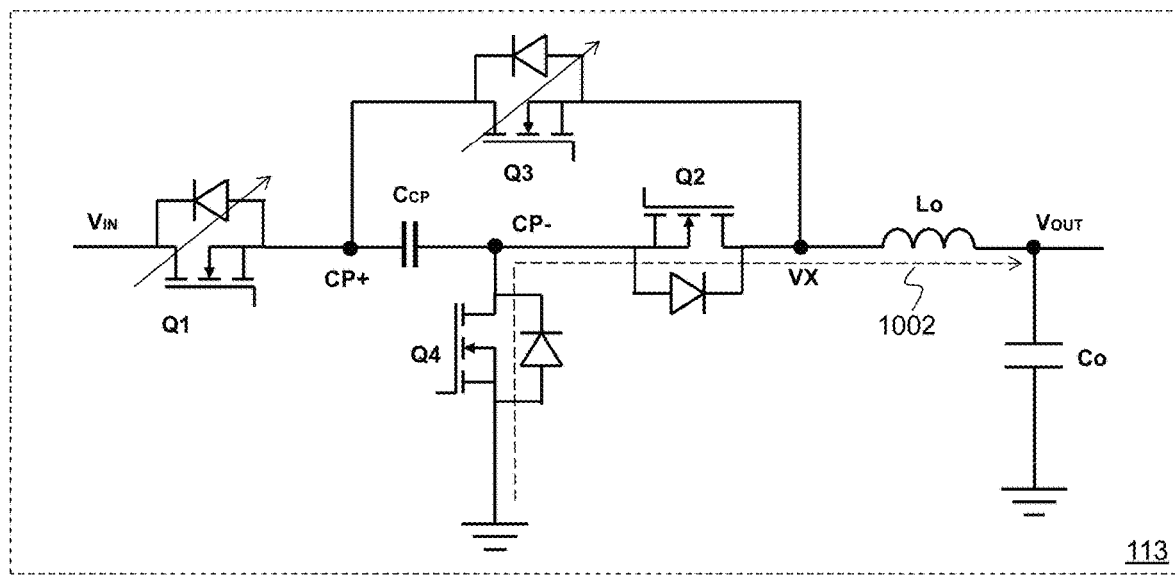
FIG. 12 illustrates the operating principle of the second phase of the hybrid converter operating in both the buck mode and the auto mode in accordance with various embodiments of the present disclosure.

FIG. 12 illustrates the operating principle of the second phase of the hybrid converter operating in both the buck mode and the auto mode in accordance with various embodiments of the present disclosure. The buck mode operating principle of the hybrid converter 113 shown in FIG. 12 is similar to that shown in FIG. 10 except that switch Q3 is turned off during the second phase. It should be noted that during the second phase, the charge pump capacitor $C_{CP}$ is floating. In addition, the charge pump capacitor $C_{CP}$ has been pre-charged to a voltage level approximately equal to twice the output voltage of the hybrid converter 113. Such a pre-charged voltage helps to achieve a smooth transition between the buck mode and the charge pump mode because the charge pump capacitor $C_{CP}$ has a voltage ready for the charge pump mode operation. Such a smooth transition between the buck mode and the charge pump mode is referred to as the auto mode throughout the description.

Figure 13:
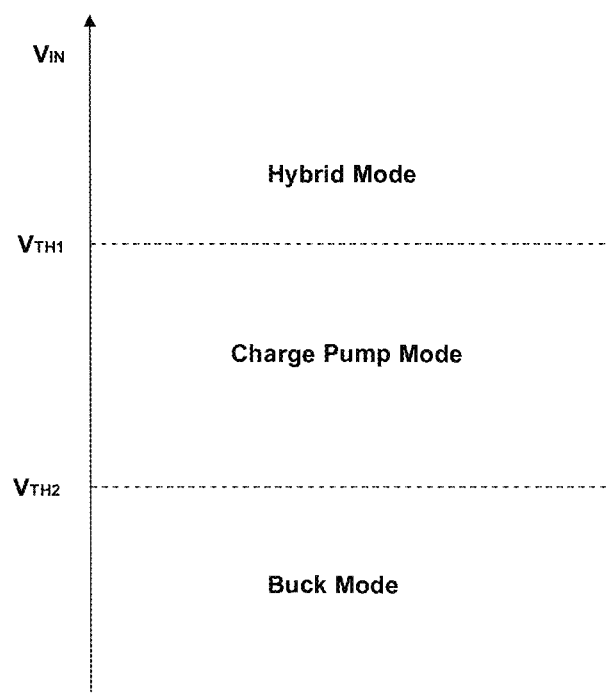
FIG. 13 illustrates the operating principle of the auto mode in accordance with various embodiments of the present disclosure.

FIG. 13 illustrates the operating principle of the auto mode in accordance with various embodiments of the present disclosure. Depending on different input and output voltages, the hybrid converter 113 is able to operate in one of the three operating modes when the auto mode is applied to the hybrid converter 113. As shown in FIG. 13, there may be two voltage thresholds, namely $V_{TH1}$ and $V_{TH2}$. $V_{TH1}$ is greater than $V_{TH2}$ as shown in FIG. 13. In some embodiments, VTH1 is approximately equal to two times the output voltage of the hybrid converter 113 plus a hysteresis voltage (VHYST). VTH2 is approximately equal to two times the output voltage of the hybrid converter 113 minus the hysteresis voltage (VHYST). In some embodiments, the hysteresis voltage (VHYST) is about 5% of the output voltage of the hybrid converter 113. It should be noted that 5% of the output voltage is merely an example. A person skilled in the art would understand the value of the hysteresis voltage (VHYST) may vary accordingly depending on different applications and design needs.

In operation, when the input voltage of the hybrid converter 113 is greater than $V_{TH1}$, the hybrid converter 113 is configured to operate in the hybrid mode. The operation principle of the hybrid mode has been described in detail above with respect to FIGS. 3-6, and hence is not discussed again. Under some operating conditions, the input voltage of the hybrid converter 113 falls into a range between $V_{TH1}$ and $V_{TH2}$, the hybrid converter 113 leaves the hybrid mode and enters into the charge pump mode. The operation principle of the charge pump mode has been described in detail above with respect to FIGS. 7-8. Furthermore, the input voltage of the hybrid converter 113 may drop below $V_{TH2}$. As shown in FIG. 13, the hybrid converter 113 leaves the charge pump mode and enters into the buck mode. The operation principle of the buck mode has been described in detail above with respect to FIGS. 10-11.

It should be noted that during an input voltage increase process, the mode transition occurs in a similar manner. For example, when the input voltage increases and exceeds $V_{TH2}$, the hybrid converter 113 leaves the buck mode and enters into the charge pump mode. Likewise, when the input voltage increases and exceeds $V_{TH1}$, the hybrid converter 113 leaves the charge pump mode and enters into the hybrid mode. The detailed mode transition process will be discussed below with respect to FIG. 14.

Figure 14:
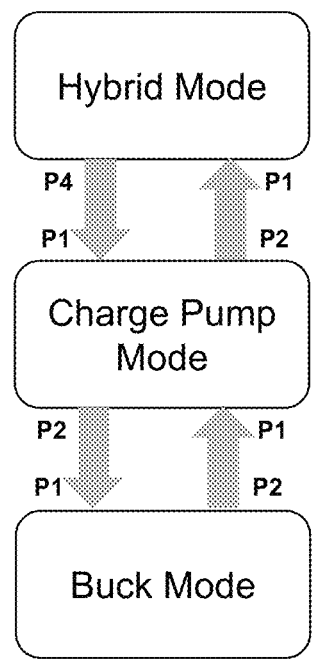
FIG. 14 illustrates the mode transition principle in accordance with various embodiments of the present disclosure.

FIG. 14 illustrates the mode transition principle in accordance with various embodiments of the present disclosure. As shown in FIG. 14, the mode transition between the hybrid mode and the charge pump mode occurs at particular phases. When the hybrid converter 113 has a mode transition from the hybrid mode to the charge pump mode, the hybrid converter 113 leaves at the end of the fourth phase of the hybrid mode and enters into the first phase of the charge pump mode. On the other hand, when the hybrid converter 113 has a mode transition from the charge pump mode to the hybrid mode, the hybrid converter 113 leaves at the end of the second phase of the charge pump mode and enters into the first phase of the hybrid mode.

FIG. 14 further illustrates the mode transition between the charge pump mode and the buck mode. As shown in FIG. 14, when the hybrid converter 113 has a mode transition from the charge pump mode to the buck mode, the hybrid converter 113 leaves at the end of the second phase of the charge pump mode and enters into the first phase of the buck mode. On the other hand, when the hybrid converter 113 has a mode transition from the buck mode to the charge pump mode, the hybrid converter 113 leaves at the end of the second phase of the buck mode and enters into the first phase of the charge pump mode.

Figure 15:
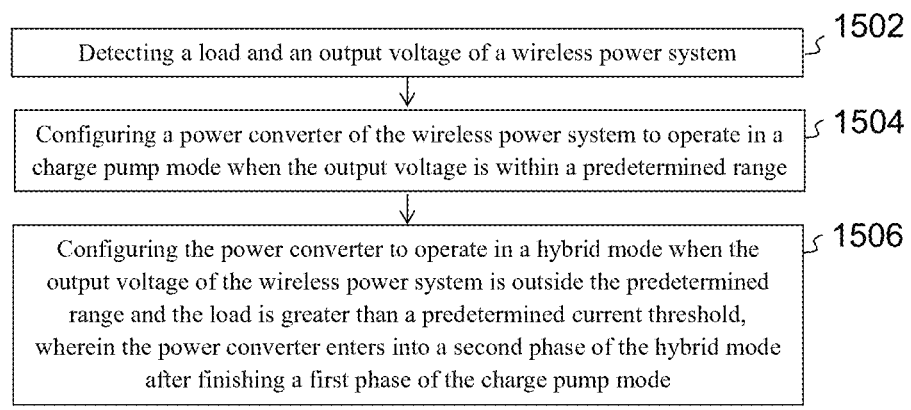
FIG. 15 illustrates a flow chart of applying a first control mechanism to the hybrid converter shown in FIG. 2 in accordance with various embodiments of the present disclosure.

FIG. 15 illustrates a flow chart of applying a first control mechanism to the hybrid converter shown in FIG. 2 in accordance with various embodiments of the present disclosure. This flowchart shown in FIG. 15 is merely an example, which should not unduly limit the scope of the claims. One of ordinary skill in the art would recognize many variations, alternatives, and modifications. For example, various steps illustrated in FIG. 15 may be added, removed, replaced, rearranged and repeated.

Referring back to FIG. 2, the hybrid converter 113 comprises four switches Q1, Q2, Q3 and Q4. Depending on different operating parameters, the hybrid converter 113 may operate in three different operating modes, namely a hybrid mode, a charge pump mode and a buck mode. The hybrid mode includes four operating phases; the charge pump mode includes two operating phases; and the buck mode includes two operating phases. In operation, depending on design needs and different applications, the hybrid converter 113 may leave one operating mode and enter into a different operating mode. For example, the hybrid converter 113 may first operate in the charge pump mode, and then enter into the hybrid mode after the operating parameters have changed.

In some embodiments, the hybrid converter 113 may automatically switch from the charge pump mode to the hybrid mode when the output voltage of the hybrid converter 113 is greater than a predetermined voltage threshold or is outside a predetermined output voltage range. For example, the hybrid converter 113 may leave the charge pump mode at an end of the first phase of the charge pump mode and enter into the hybrid mode at a beginning of the second phase of the hybrid mode. The operating mode transition between the charge pump mode and the hybrid mode is accomplished by the following steps.

At step 1502, the load and output voltage of the wireless power system is detected by a suitable sensing apparatus or a plurality of sensing devices. The detected load and voltage are processed by a controller. In particular, the detected load current and/or the output voltage are compared with predetermined current and/or voltage thresholds or ranges. In some embodiments, the controller may be a digital controller.

At step 1504, the hybrid converter 113 is configured to operate in the charge pump mode when the output voltage is within a predetermined output voltage range and the load current is over a predetermined current threshold. The operation of the charge pump mode has been described in detail above with respect to FIGS. 7-8.

It should be noted that the predetermined output voltage range is merely an example, which should not unduly limit the scope of the claims. One of ordinary skill in the art would recognize many variations, alternatives, and modifications. For example, the input voltage tolerance of the load may be a factor in the process of determining the operating mode of the hybrid converter 113.

At step 1506, the hybrid converter is configured to operate in the hybrid mode when the output voltage of the wireless power system is outside the predetermined range and the load is greater than the predetermined current threshold. In some embodiments, during the operating mode transition, the hybrid converter 113 enters into a second phase of the hybrid mode after finishing a first phase of the charge pump mode.

Figure 16:
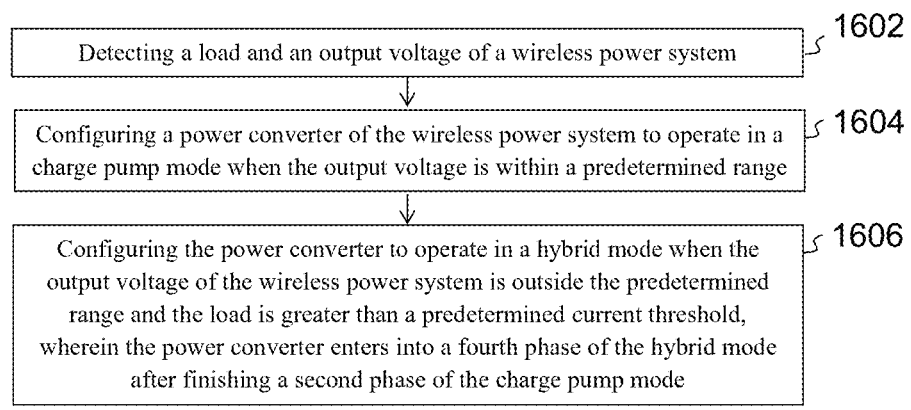
FIG. 16 illustrates a flow chart of applying a second control mechanism to the hybrid converter shown in FIG. 2 in accordance with various embodiments of the present disclosure.

FIG. 16 illustrates a flow chart of applying a second control mechanism to the hybrid converter shown in FIG. 2 in accordance with various embodiments of the present disclosure. This flowchart shown in FIG. 16 is merely an example, which should not unduly limit the scope of the claims. One of ordinary skill in the art would recognize many variations, alternatives, and modifications. For example, various steps illustrated in FIG. 16 may be added, removed, replaced, rearranged and repeated.

The operating mode transition control mechanism shown in FIG. 16 is similar to that shown in FIG. 15 except that the operating mode transition occurs at a different time. It should be noted that the operating mode transition control mechanisms shown in FIGS. 15-16 may be taken individually or in combination to further improve the performance of the hybrid converter 113.

At step 1602, the load and output voltage of the wireless power system is detected by a suitable sensing apparatus or a plurality of sensing devices. The detected load and voltage are processed by a controller. In particular, the detected load current is compared with predetermined current and/or voltage thresholds.

At step 1604, the hybrid converter 113 is configured to operate in the charge pump mode when the output voltage is within a predetermined range and the load current is over a predetermined current threshold. The operation of the charge pump mode has been described in detail above with respect to FIGS. 7-8.

At step 1606, the hybrid converter 113 is configured to operate in the hybrid mode when the output voltage of the wireless power system is outside the predetermined range and the load is greater than the predetermined current threshold. In some embodiments, during the operating mode transition, the hybrid converter 113 enters into the fourth phase of the hybrid mode after finishing the second phase of the charge pump mode.

Figure 17:
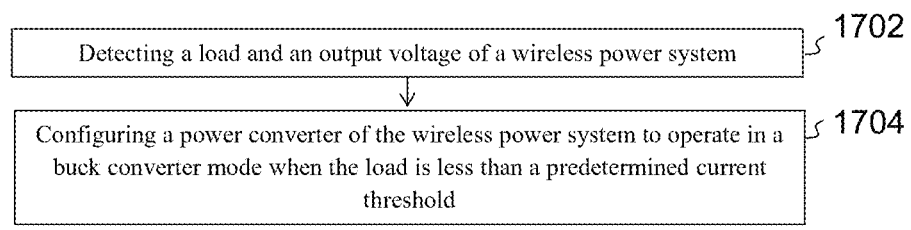
FIG. 17 illustrates a flow chart of applying a third control mechanism to the hybrid converter shown in FIG. 2 in accordance with various embodiments of the present disclosure.

FIG. 17 illustrates a flow chart of applying a third control mechanism to the hybrid converter shown in FIG. 2 in accordance with various embodiments of the present disclosure. This flowchart shown in FIG. 17 is merely an example, which should not unduly limit the scope of the claims. One of ordinary skill in the art would recognize many variations, alternatives, and modifications. For example, various steps illustrated in FIG. 17 may be added, removed, replaced, rearranged and repeated.

At step 1702, the load and output voltage of the wireless power system is detected by a suitable sensing apparatus or a plurality of sensing devices. The detected load and voltage are processed by a controller. In particular, the detected load current and/or the detected output voltage are compared with predetermined current and/or voltage thresholds.

At step 1704, the hybrid converter 113 is configured to operate in the buck mode when the load is less than a predetermined current threshold. The operation of the buck mode has been described in detail above with respect to FIGS. 9-10.

Figure 18:
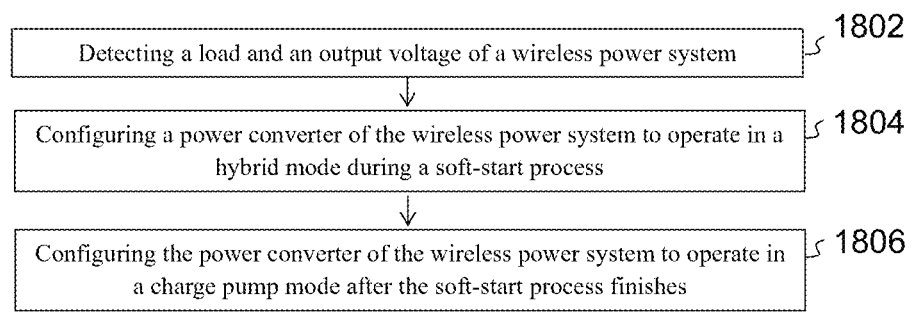
FIG. 18 illustrates a flow chart of applying a fourth control mechanism to the hybrid converter shown in FIG. 2 in accordance with various embodiments of the present disclosure.

FIG. 18 illustrates a flow chart of applying a fourth control mechanism to the hybrid converter shown in FIG. 2 in accordance with various embodiments of the present disclosure. This flowchart shown in FIG. 18 is merely an example, which should not unduly limit the scope of the claims. One of ordinary skill in the art would recognize many variations, alternatives, and modifications. For example, various steps illustrated in FIG. 18 may be added, removed, replaced, rearranged and repeated.

At step 1802, the load and output voltage of the wireless power system is detected by a suitable sensing apparatus or a plurality of sensing devices. The detected load and voltage are processed by a controller. In particular, the detected load current is compared with predetermined current and/or voltage thresholds.

At step 1804, the hybrid converter 113 is configured to operate in the hybrid mode during a soft start process of the hybrid converter 113. The operation of the hybrid mode mode has been described in detail above with respect to FIGS. 3-6.

At step 1806, the hybrid converter 113 is configured to operate in the charge pump mode after the soft start process finishes and the output voltage has been fully established. The mode transitions between the hybrid mode and the charge pump mode have been described above in detail with respect to FIGS. 14-16, and hence are not discussed again to avoid unnecessary repetition.

It should be noted that the mode transition may occur during the soft start process. For example, the mode transition from the hybrid mode to the charge pump mode may occur when the output voltage exceeds a predetermined value (e.g., 80% of the final output voltage).

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
  detecting a load current, an input voltage and an output voltage of a power system comprising a rectifier and a hybrid converter, wherein the hybrid converter comprises:
    a first switch, a capacitor and a second switch connected in series between an output of the rectifier and an output filter;
    a third switch connected between a common node of the first switch and the capacitor, and a common node of the second switch and the output filter; and
    a fourth switch connected between a common node of the capacitor and the second switch, and ground;
  configuring the hybrid converter to operate in three different operating modes in response to different operating conditions; and
  configuring the hybrid converter to leave a first operating mode and enter into a second operating mode in response to an operating condition change.

2. The method of claim 1, further comprising:
   detecting a load current of a wireless power transfer system comprising the rectifier and the hybrid converter connected in cascade between a receiver coil and a load; and
   configuring the hybrid converter to operate in three different operating modes in response to different operating conditions of the wireless power transfer system.

3. The method of claim 2, wherein the wireless power transfer system comprises:
   a transmitter switching network coupled to an input power source;
   a transmitter coil coupled to the transmitter switching network;
   the receiver coil magnetically coupled to the transmitter coil;
   the rectifier connected to the receiver coil; and
   the hybrid converter connected between the rectifier and the load.

4. The method of claim 1, further comprising:
   configuring the hybrid converter to operate in a buck mode when a ratio of the output voltage to the input voltage is greater than a predetermined threshold, wherein the second switch and the third switch are always on in the buck mode.

5. The method of claim 1, further comprising:
   configuring the hybrid converter to operate in a hybrid mode when a ratio of the output voltage to the input voltage is less than a predetermined threshold, wherein the hybrid mode comprises four operating phases.

6. The method of claim 5, wherein:
   in a first phase of the hybrid mode, the first switch and the second switch are configured to be turned on, and the third switch and the fourth switch are configured to be turned off;
   in a second phase of the hybrid mode, the second switch and the fourth switch are configured to be turned on, and the first switch and the third switch are configured to be turned off;
   in a third phase of the hybrid mode, the third switch and the fourth switch are configured to be turned on, and the first switch and the second switch are configured to be turned off; and
   in a fourth phase of the hybrid mode, the second switch and the fourth switch are configured to be turned on, and the first switch and the third switch are configured to be turned off.

7. The method of claim 5, further comprising:
   configuring the hybrid converter to operate in a charge pump mode when the ratio of the output voltage to the input voltage is greater than the predetermined threshold, wherein the charge pump mode comprises a first phase and a second phase, and wherein:
   in a first phase of the charge pump mode, the first switch and the second switch are configured to be turned on, and the third switch and the fourth switch are configured to be turned off; and
   in a second phase of the charge pump mode, the third switch and the fourth switch are configured to be turned on, and the first switch and the second switch are configured to be turned off.

8. The method of claim 7, wherein:
   the hybrid converter automatically switches from the charge pump mode to the hybrid mode when the ratio of the output voltage to the input voltage is less than the predetermined threshold, and wherein the hybrid converter leaves the charge pump mode at an end of the first phase of the charge pump mode and enters into the hybrid mode at a beginning of the second phase of the hybrid mode.

9. A system comprising:
   a receiver coil configured to be magnetically coupled to a transmitter coil;
   a rectifier connected to the receiver coil; and
   a hybrid converter connected between the rectifier and a load, wherein the hybrid converter is configured to operate in three different operating modes in response to different load currents and output voltages of the system.

10. The system of claim 9, wherein the hybrid converter comprises:
    a first switch, a capacitor and a second switch connected in series between an output of the rectifier and an output filter;
    a third switch connected between a common node of the first switch and the capacitor, and a common node of the second switch and the output filter; and
    a fourth switch connected between a common node of the capacitor and the second switch, and ground.

11. The system of claim 10, wherein:
    the hybrid converter is configured to operate in a buck mode when a ratio of an output voltage of the hybrid converter to an input voltage of the hybrid converter is greater than a predetermined threshold, wherein the buck mode comprises two operating phases; and
    the hybrid converter is configured to operate in a hybrid mode when the ratio of the output voltage of the hybrid converter to the input voltage of the hybrid converter is less than the predetermined threshold, wherein the hybrid mode comprises four operating phases.

12. The system of claim 10, wherein:
    the hybrid converter is configured to operate in a buck mode when a ratio of an output voltage of the hybrid converter to an input voltage of the hybrid converter is greater than a predetermined threshold, wherein the buck mode comprises two operating phases; and
    the hybrid converter is configured to operate in a charge pump mode when a ratio of the output voltage of the hybrid converter to the input voltage of the hybrid converter is less than the predetermined threshold, wherein the charge pump mode comprises two operating phases.

13. A system comprising:
    a receiver coil magnetically coupled to a transmitter coil;
    a rectifier connected to the receiver coil; and
    a hybrid converter connected to the rectifier, wherein the hybrid converter is configured to operate in at least two different operating modes, and wherein the hybrid converter comprises:
    an output filter;
    a first switch, a capacitor and a second switch connected in series between an output of the rectifier and the output filter;
    a third switch connected between a common node of the first switch and the capacitor, and a common node of the second switch and the output filter; and
    a fourth switch connected between a common node of the capacitor and the second switch, and ground.

14. The system of claim 13, wherein:
    the hybrid converter is configured to operate in three operating modes including a hybrid mode, a buck mode and a charge pump mode.

15. The system of claim 14, wherein:
the hybrid mode comprises four operating phases;
the charge pump mode comprising two operating phases; and
the buck mode comprises two operating phases.

16. The system of claim 13, wherein:
the output filter is an inductor-capacitor (L-C) filter.

17. The system of claim 13, wherein:
the system is a wireless power transfer system configured to transfer power from a transmitter to a receiver.

18. The system of claim 13, further comprising:
a resonant capacitor connected between the receiver coil and the rectifier.

\* \* \* \* \*